United States Patent
Jahkonen et al.

(10) Patent No.: US 7,121,385 B2
(45) Date of Patent: Oct. 17, 2006

(54) METHOD AND APPARATUS FOR ADJUSTMENT OF THE ROTOR ANGLE OF AN ELEVATOR MOTOR

(75) Inventors: Pekka Jahkonen, Hyvinkää (FI); Antti Kallioniemi, Hyvinkää (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 11/204,037

(22) Filed: Aug. 16, 2005

(65) Prior Publication Data
US 2006/0032710 A1 Feb. 16, 2006

Related U.S. Application Data

(63) Continuation of application No. PCT/FI2004/000089, filed on Feb. 24, 2004.

(30) Foreign Application Priority Data
Feb. 27, 2003 (FI) .................................. 20030302

(51) Int. Cl.
*B66B 1/28* (2006.01)
(52) U.S. Cl. ...................................... 187/293; 318/437
(58) Field of Classification Search ................ 187/277, 187/289, 293, 295, 296, 297; 318/700, 701, 318/711, 715, 716–723, 432, 437, 705, 799, 318/807–811; 702/65, 115
See application file for complete search history.

(56) References Cited

U.S. PATENT DOCUMENTS

| | | | |
|---|---|---|---|
| 3,909,688 A | 9/1975 | Blaschke et al. | |
| 3,936,722 A * | 2/1976 | Goto et al. | 322/20 |
| 4,731,571 A | 3/1988 | Donley | |
| 5,963,007 A * | 10/1999 | Toyozawa et al. | 318/799 |
| 6,049,182 A * | 4/2000 | Nakatani et al. | 318/432 |
| 6,285,961 B1 * | 9/2001 | Jahkonen et al. | 702/115 |
| 6,822,417 B1 * | 11/2004 | Kawaji et al. | 318/701 |
| 6,831,439 B1 * | 12/2004 | Won et al. | 318/701 |
| 2001/0024100 A1* | 9/2001 | Shinnaka | 318/701 |
| 2001/0028236 A1* | 10/2001 | Cheong | 318/701 |
| 2002/0109479 A1* | 8/2002 | Kishibe et al. | 318/811 |

FOREIGN PATENT DOCUMENTS

| | | |
|---|---|---|
| EP | 0 195 390 A2 | 9/1986 |
| EP | 0 702 451 A1 | 3/1996 |

(Continued)

OTHER PUBLICATIONS

Takano, A., IEEE Transactions on Industrial Electronics, IEEE Inc., vol. 43, No. 6, Dec. 1, 1996, pp. 640-646, XP000643572.

*Primary Examiner*—Jonathan Salata
(74) *Attorney, Agent, or Firm*—Birch, Stewart, Kolasch & Birch, LLP.

(57) ABSTRACT

A method and an apparatus for adjustment of the rotor angle of an elevator motor (M), in which method: the rotor angle of the elevator motor is measured, the rotor angle is adjusted by using the measured rotor angle value as feedback data, and the rotor angle is measured by a pulse emitter (PE) or tachometer connected to the elevator motor. In the method, a disturbance signal (u) is fed into the rotor angle feedback data to produce a change (disturbance) in the rotor angle, the change (disturbance) is compared to the disturbance signal (u), and, on the basis of the comparison, a control signal is generated to adjust the rotor angle.

5 Claims, 1 Drawing Sheet

FOREIGN PATENT DOCUMENTS

FI 981353 12/1999

GB 1039892 A 8/1966

* cited by examiner

METHOD AND APPARATUS FOR ADJUSTMENT OF THE ROTOR ANGLE OF AN ELEVATOR MOTOR

This application is a Continuation of copending PCT International Application No. PCT/FI2004/000089 filed on Feb. 24, 2004, which designated the United States, and on which priority is claimed under 35 U.S.C. § 120. This application also claims priority under 35 U.S.C. § 119(a) on U.S. patent application Ser. No(s). 20030302 filed in Finland on Feb. 27, 2003. The entire contents of each of the above documents is hereby incorporated by reference.

FIELD OF THE INVENTION

The present invention relates to a method as defined in the preamble of claim 1 and to an apparatus as defined in the preamble of claim 4 for adjustment of the rotor angle of an elevator motor.

DESCRIPTION OF THE BACKGROUND ART

The torque of a synchronous motor is proportional to the angular difference between the magnetic field of the rotor and the magnetic field of the stator, i.e. to the rotor angle. The torque is at a maximum when the rotor angle is 90° and decreases according to a sine function as the rotor angle changes. The torque curve of synchronous motors designed for use in elevator drives is a nearly sinusoidal function of the rotor angle. One of the tasks of the elevator control system is to keep the torque at the maximum point.

At present, the rotor position is typically determined by means of a resolver, which produces feedback data on the absolute rotor position, which is needed e.g. in vector control.

However, flat elevator motors designed for elevators without machine room and placed in the elevator shaft provide relatively little space, which is why it is often not possible to use a resolver in such a situation because it can not be mounted in the elevator shaft due to insufficient space. In addition, a resolver is relatively expensive and adjusting it is a complicated task.

To determine the rotor position data, it is also possible to use a pulse emitter or a tachometer. However, such systems are relatively device-dependent and are therefore not directly applicable e.g. for use in elevators. The pulse emitter or tachometer is generally connected to the rotor via a belt transmission or a friction wheel. This involves a slip, which tends to increase. Thus, there is the risk that the torque will decrease. The motor may even fall out of synchronism, in which case the torque is lost completely.

BRIEF SUMMARY OF THE INVENTION

The object of the present invention is to get rid of the drawbacks of prior art and achieve a new type of feedback arrangement that can be used to keep the rotor angle at an optimum point without a sensor giving absolute position data, but in which it is possible to use a pulse emitter or tachometer connected to the motor.

The system of the invention is based on adding to the rotor angle feedback data a disturbance signal, by means of which the absolute rotor angle is determined.

The invention allows elevator motors, e.g. flat elevator motors mounted in the elevator shaft, to be more easily operated by a vector control system, leading to improvements in the operating properties of the elevator.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompaning drawings, which are given by way of illustration only, and thus are not limitative of the present invention, and wherein.

DETAILED DESCRIPTION OF THE INVENTION

Figure 1:
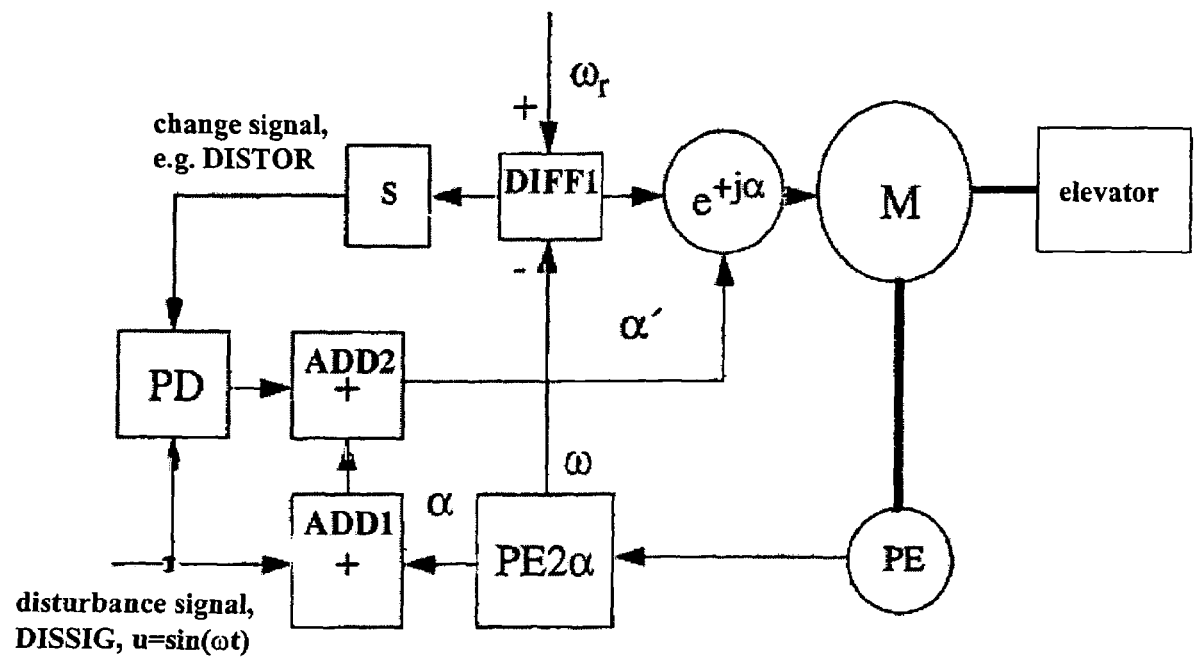
FIG. 1 represents the apparatus of the invention for adjusting the rotor angle of an elevator motor.

In the apparatus according to FIG. 1, there is connected to the elevator motor M a pulse emitter PE, which is connected to an angle/speed conversion unit PE2$\alpha$, from which the angle data $\alpha$ is input to adders ADD1 and ADD2. In addition, the apparatus comprises a phase detector PD (four-quadrant multiplier) to which are input an estimated torque ripple and a disturbance signal, a differentiator DIFF1, the torque being estimated from speed feedback S as the difference between a speed reference $\omega_r$ and the actual speed $\omega$ given by the angle/speed conversion unit PE2$\alpha$, and a vector rotator $e^{+j\alpha}$, which generates a three-phase current reference for the motor on the basis of signals obtained from the adder and the differentiator DIFF1.

The system works as follows. The system (pulse detector PD and adder ADD1) is supplied with e.g. a sinusoidal disturbance signal DISSIG u=sin ($\omega$t), which is added to the angle value produced by the rotor angle feedback circuit (pulse emitter PE, angle/speed conversion unit PE2$\alpha$), with the result that the angle and therefore the torque vary. Via an analysis it can be established that the 'disturbance torque' $\Delta$T is completely different on different sides of the optimum angle (pi/2 in FIG. 2). The analysis can be performed by computing the function:

$$T+\Delta T=\sin(pi/2+\Delta(\delta)+u^*\sin(\omega t)) \qquad (1)$$

where T is torque, $\Delta$T is disturbance torque and $\Delta(\delta)$ is "DC" misalignment angle.

Figure 2:
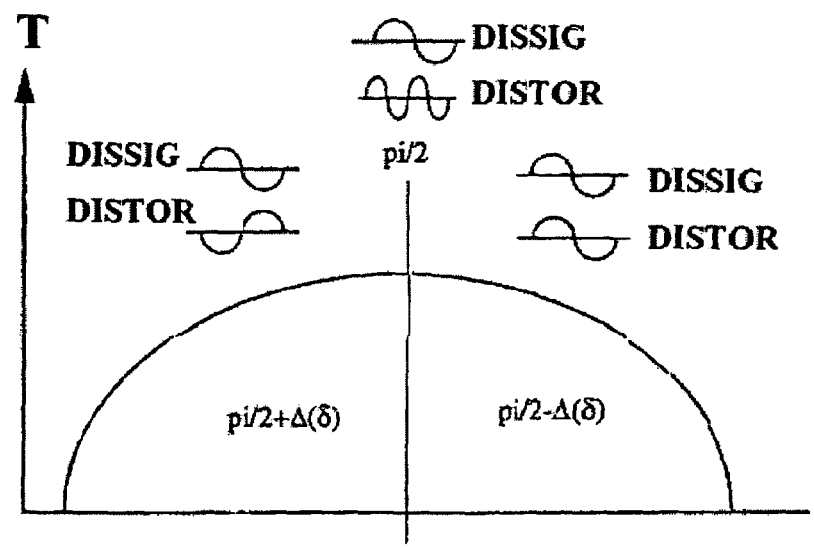
FIG. 2 represents the torque curve of an elevator motor.

If the angle is below the optimum point (case: pi/2−$\Delta(\delta)$), then the disturbance torque DISTOR is in phase with the disturbance signal; and vice versa (see FIG. 2). If the angle is correct, then the phase difference between the disturbance and the disturbance torque is 90° and the frequency of torque ripple is twice as high as otherwise. For a larger misalignment angle, the disturbance torque. is greater, which generates P-type control automatically.

If the disturbance and the signal originating it are compared by means of a phase detector, the output will give a DC control signal that keeps the angle at the optimum point.

In this case, the measurement signal is speed feedback because no torque detector is used. The disturbance signal is so chosen that it will not produce any disturbances on the elevator car.

It is obvious to the person skilled in the art that different embodiments of the invention are not limited to the example described above, but that they may be varied within the scope of the claims presented below.

The invention claimed is:

1. A method for adjustment of the rotor angle of an elevator motor (M) comprising the steps of:
   measuring the rotor angle of the elevator motor,
   adjusting the rotor angle by using the measured rotor angle value as feedback data;
   measuring the rotor angle by a pulse emitter (PE) or tachometer connected to the elevator motor;
   adding a disturbance signal (u) to the rotor angle feedback data, said signal producing a change (disturbance) in the rotor angler;
   comparing the change (disturbance) to the disturbance signal (u); and
   on the basis of the comparison, generating a control signal to adjust the rotor angle.

2. The method according to claim 1, wherein the change signal is a torque change signal (DISTOR).

3. The method according to claim 1, wherein the change signal is generated from an actual speed signal and a speed reference.

4. An apparatus for adjustment of the rotor angle of an elevator motor (M), comprising:
   means for measuring the rotor angle of the elevator motor;
   a control circuit used to adjust the rotor angle by using the measured rotor angle value as feedback data;
   said means for measuring the rotor angle comprising a pulse emitter (PE) or tachometer connected to the elevator motor;
   the control circuit comprises means for
     feeding a disturbance signal into the rotor angle feedback data to produce a change (disturbance) in the rotor angle,
     comparing the change (disturbance) to the disturbance signal (u), and
   generating a control signal based on the comparison to adjust the rotor angle.

5. The apparatus according to claim 4, wherein the control circuit comprises a phase detector, by which the change signal and the disturbance signal are compared.

* * * * *